US011163891B2

(12) United States Patent
Dietsch et al.

(10) Patent No.: US 11,163,891 B2
(45) Date of Patent: *Nov. 2, 2021

(54) IDENTIFYING COMPUTER PROGRAM SECURITY ACCESS CONTROL VIOLATIONS USING STATIC ANALYSIS

(71) Applicant: International Business Machines Corporation, Armonk, NY (US)

(72) Inventors: Matthias Daniel Dietsch, Freiburg (DE); Pietro Ferrara, White Plains, NY (US); Marco Pistoia, Amawalk, NY (US); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/803,044

(22) Filed: Feb. 27, 2020

(65) Prior Publication Data

US 2020/0202009 A1 Jun. 25, 2020

Related U.S. Application Data

(63) Continuation of application No. 16/676,035, filed on Nov. 6, 2019, now Pat. No. 10,956,580, and a
(Continued)

(51) Int. Cl.
*G06F 21/00* (2013.01)
*G06F 21/57* (2013.01)
(Continued)

(52) U.S. Cl.
CPC ............ *G06F 21/577* (2013.01); *G06F 21/52* (2013.01); *G06F 30/33* (2020.01); *G06F 2221/033* (2013.01)

(58) Field of Classification Search
CPC ........ G06F 21/577; G06F 30/33; G06F 21/52; G06F 2221/033
See application file for complete search history.

(56) References Cited

U.S. PATENT DOCUMENTS 7,469,403 B2   12/2008   Choi et al.
7,877,780 B2    1/2011   Kolawa et al.
(Continued)

FOREIGN PATENT DOCUMENTS

CN         202488761 U      10/2012

OTHER PUBLICATIONS

Non-Final Office Action received for U.S. Appl. No. 16/676,035 dated Aug. 21, 2020, 27 pages.
(Continued)

*Primary Examiner* — John B King
(74) *Attorney, Agent, or Firm* — Amin, Turocy & Watson, LLP

(57) ABSTRACT

Techniques for identifying computer program security access control violations using static program analysis are provided. In one example, a computer-implemented method comprises generating, by a device operatively coupled to a processor, a mathematical model of a computer program product, wherein the mathematical model defines data flows through nodes of the computer program product that reach a secure node corresponding to a secure resource. The computer implemented method further comprises evaluating, by the device, a security protocol of the computer program product using static program analysis of the mathematical model to determine whether any of the data flows provides access to the secure node without proceeding through one or more security nodes corresponding to the security protocol, wherein the one or more security nodes are included in the nodes of the computer program product.

20 Claims, 9 Drawing Sheets

Related U.S. Application Data continuation of application No. 15/836,819, filed on Dec. 8, 2017, now Pat. No. 10,650,149, and a continuation of application No. 15/595,285, filed on May 15, 2017, now Pat. No. 10,614,224.

(51) Int. Cl.
*G06F 21/52* (2013.01)
*G06F 30/33* (2020.01)

(56) References Cited

U.S. PATENT DOCUMENTS

| | | | |
|---|---|---|---|
| 7,934,249 B2 | 4/2011 | Chan et al. | |
| 8,209,738 B2 | 6/2012 | Nicol et al. | |
| 8,572,674 B2 | 10/2013 | Dolby et al. | |
| 8,635,602 B2 | 1/2014 | Haviv | |
| 8,689,180 B2 | 4/2014 | Chandra et al. | |
| 8,793,800 B2* | 7/2014 | Berg | G06F 21/577 726/25 |
| 8,839,351 B2* | 9/2014 | Beskrovny | G06F 21/604 726/1 |
| 8,881,288 B1 | 11/2014 | Levy et al. | |
| 9,026,987 B2 | 5/2015 | Cifra | |
| 9,171,168 B2* | 10/2015 | O'Neil | G06F 21/577 |
| 9,219,755 B2 | 12/2015 | Touboul | |
| 9,256,409 B2 | 2/2016 | Pistoia et al. | |
| 2005/0273854 A1* | 12/2005 | Chess | G06F 21/577 726/22 |
| 2005/0273859 A1* | 12/2005 | Chess | G06F 21/577 726/25 |
| 2005/0273860 A1* | 12/2005 | Chess | G06F 21/577 726/25 |
| 2007/0055658 A1 | 3/2007 | Hsiao et al. | |
| 2008/0209567 A1* | 8/2008 | Lockhart | G06F 21/577 726/25 |
| 2008/0301765 A1 | 12/2008 | Nicol et al. | |
| 2009/0316623 A1 | 12/2009 | Pettersson et al. | |
| 2011/0126282 A1 | 5/2011 | Centonze et al. | |
| 2012/0023553 A1* | 1/2012 | Berg | G06F 21/577 726/4 |
| 2012/0131670 A1 | 5/2012 | Artzi et al. | |
| 2013/0031622 A1 | 1/2013 | Berg et al. | |
| 2013/0033622 A1 | 2/2013 | Li | |
| 2014/0020093 A1* | 1/2014 | Scholte | G06F 21/6218 726/22 |
| 2014/0026185 A1 | 1/2014 | Dolby et al. | |
| 2014/0157417 A1 | 6/2014 | Grubel et al. | |
| 2015/0089637 A1* | 3/2015 | Centonze | G06F 21/604 726/21 |
| 2015/0096034 A1 | 4/2015 | O'Neil et al. | |
| 2015/0172320 A1 | 6/2015 | Colombo et al. | |
| 2015/0242626 A1 | 8/2015 | Wang et al. | |
| 2016/0078234 A1* | 3/2016 | Li | G06F 21/577 726/25 |
| 2016/0180096 A1 | 6/2016 | Sharma et al. | |
| 2017/0099675 A1 | 4/2017 | Gineste et al. | |
| 2018/0027478 A1 | 1/2018 | Sama | |
| 2018/0330102 A1 | 11/2018 | Siman et al. | |
| 2019/0052549 A1 | 2/2019 | Duggal et al. | |
| 2019/0182289 A1 | 6/2019 | White | |
| 2019/0251260 A1 | 8/2019 | Stockdale et al. | |

OTHER PUBLICATIONS

Kateb et al., "Access Control Enforcement Testing", 8th International Workshop on Automation of Software Test, Conference Publishing Consulting, May 18, 2013, pp. 64-70.

Weiss et al., "Database-Backed Program Analysis for Scalable Error Propagation", Proceedings of the 37th International Conference on Software Engineering, 2015, 12 pages.

Reps et al., "Precise interprocedural dataflow analysis via graph leachability", Proceedings of the 22nd ACM SIGPLAN-SIGACT symposium on Principles of Programming Languages, ACM, Jan. 1995, pp. 49-61.

Saltzer et al., "The Protection of Information in Computer Systems", URL: http://www.cs.virginia.edu/~evans/cs551/saltzer/, 1975, 58 pages.

Non-Final Office Action received for U.S. Appl. No. 15/595,285 dated Nov. 2, 2018, 40 pages.

List of IBM Patents or Applications treated as related.

Non-Final Office Action received for U.S. Appl. No. 15/836,819 dated Nov. 19, 2018, 33 pages.

Final Office Action received for U.S. Appl. No. 15/836,819 dated Mar. 21, 2019, 33 pages.

Final Office Action received for U.S. Appl. No. 15/595,285 dated Apr. 18, 2019, 32 pages.

U.S. Appl. No. 15/595,285, filed May 15, 2017.
U.S. Appl. No. 15/836,819, filed Dec. 8, 2017.
U.S. Appl. No. 16/676,035, filed Nov. 6, 2019.

* cited by examiner

RDataImpl
```
public string getData(string credentials, string arg)
    throws UnsupportedOperationException {
    final LocalImpl l = (LocalImpl)_map.get(arg);
    return l.getData(credentials, arg);
}
```

LocalImpl
```
public string getData(string credentials, string arg) {
    return ProtectedResource.getSecret(_secret);
}
```

ProtectedRDataImpl
```
public string getData(string credentials, string arg)
    throws UnsupportedOperationException {
    _auth.doCheck(credentials);
    return super.getData(credentials, arg);
}
```

IDENTIFYING COMPUTER PROGRAM SECURITY ACCESS CONTROL VIOLATIONS USING STATIC ANALYSIS

BACKGROUND

The subject disclosure relates to identifying computer program security access control violations using static analysis.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate identifying computer program security access control violations using static analysis are described.

According to an embodiment of the present invention, a system can comprise a memory that stores computer executable components and a processor that executes the computer executable components stored in the memory. The computer executable components can comprise a modeling component that generates a mathematical model of a computer program product, wherein the mathematical model defines data flows through nodes of the computer program product that reach a protected node corresponding to a protected data object. The computer executable components can further comprise a security evaluation component that evaluates a security protocol of the computer program product using static program analysis of the mathematical model to determine whether any of the data flows provides access to the protected node without proceeding through one or more security nodes corresponding to the security protocol, wherein the one or more security nodes are included in the nodes of the computer program product.

In some embodiments, elements described in connection with the system can be embodied in different forms such as a computer-implemented method, a computer program product, or another form.

DESCRIPTION OF THE DRAWINGS

FIG. 3 presents the source code of an example computer program product in accordance with one or more embodiments of the disclosed subject matter.

DETAILED DESCRIPTION

Figure 1:
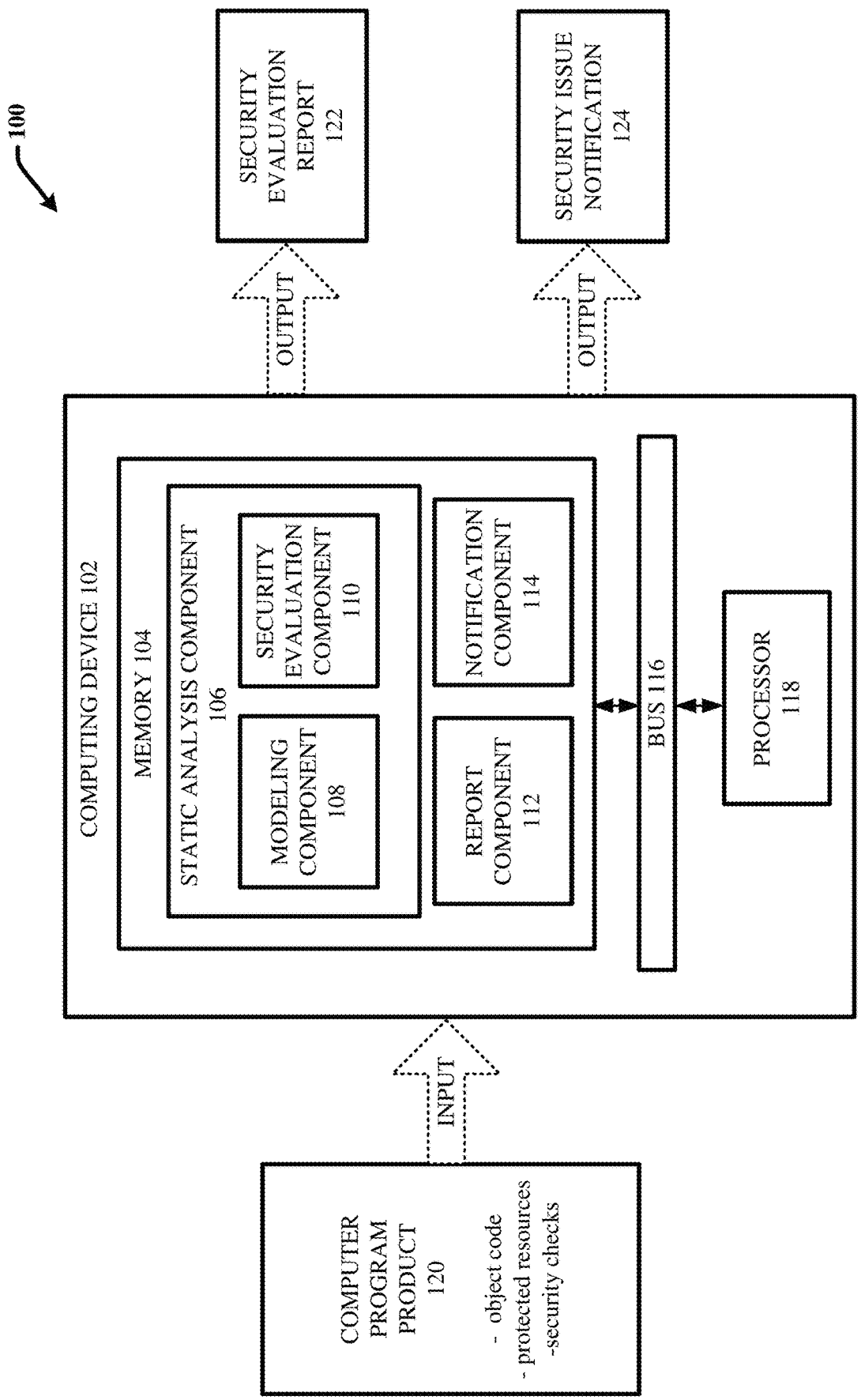
FIG. 1 illustrates a block diagram of an example, non-limiting system that facilitates identifying computer program security access control violations using static program analysis in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Computer systems can have many defined secure or protected resources that employ security measures (e.g., authentication and authorization checks) to restrict access to the protected resources. For example, it can be beneficial to control access to a network socket (e.g., an endpoint for a communication across a computer network), as viruses and other malicious software programs can use a socket to send and receive data, potentially without a user's knowledge. In this regard, the Principle of Complete Mediation dictates that access to any protected source for a computer system should be preceded by an appropriate verification check. Such verification can include an authentication check, wherein the identity of the entity requesting access is verified, and an authorization check, wherein authorization for the entity to access the resource is verified.

Modern programming languages and runtime environment often come with a security model embedded into the language. The programming language is what is used to write a software program and the runtime environment is what is used to execute the program. For example, modern software runtime environments (e.g., JAVA®, ANDROID®, iOS®, MICROSOFT.NET®, common language runtime (CLR), etc.), operating systems and application servers often come with internal authentication and authorization systems. As a result, developers writing applications to these environments, operating systems and application servers do not have to code all the authorization and authentication checks, but can just invoke the necessary application program interfaces (APIs) and rely on the underlying systems to enforce the required access control calls. This provides a great advantage because transferring security enforcement to the underlying environment reduces the chances of introducing security vulnerabilities at the application level. However, there is unfortunately no guarantee that even the security measures adopted at the level of the underlying environment have been properly implemented and enforced. For example, there may be paths leading to authorization checks without a previous authentication check, and there may be paths leading to sensitive resources that are not guarded by the appropriate authorization checks.

In one or more embodiments, the subject disclosure provides techniques for ensuring that all possible paths provided by a computer program product to a secure resource are proceeded by the appropriate security check without manual code review or dynamic testing. For example, manual code review is a tedious, time-consuming and error-prone process. For large and complex programs and runtime environments, manual code review can be completely intractable. Although dynamic testing is easier and more automated than manual code review, dynamic testing generally requires the program being executed in order to function and also usually utilizes access to source code. For example, dynamic testing consists of running the program and detecting access-control violations at runtime. Hence, dynamic program analysis generally calls for the program to be installed (which consumes resources (e.g., time, memory, processing, etc.) and executed (which can expose the analysis system to security threats). Since dynamic program analysis functions during execution of the computer program being analyzed, a full analysis calls for every code segment to be executed (which is generally infeasible, if not impossible). For example, every code branch, every possible input, or other possible permutations may be infinite or too numerous to test. Thus, dynamic program analysis generally may not be able to discover all potential errors, bugs, or other warnings. Accordingly, an inherent limitation of dynamic testing is that this technique suffers from false negatives. Any test suite is unlikely to provide full coverage for any complex program. Therefore, access-control-enforcement violations may remain undiscovered until production time.

As opposed to using manual code review or dynamic testing, one or more embodiments of the subject disclosure provides techniques that can employ static program analysis to identify computer program product security vulnerabilities. In particular, the subject disclosure provides systems, methods and computer readable media that can employ static program analysis to verify that any computer program authorization check is preceded by the appropriate authentication routine, and that access to any sensitive or protected resource is preceded by the appropriate authorization check. Static program analysis can involve examining computer program statements and/or instructions in order to build a mathematical model for the computer program. The model can be used to infer properties of the computer program. Unlike manual code review or dynamic testing, the subject static program analysis techniques can be employed to identify all possible security violations prior to runtime. For instance, static program analysis does not require the program being analyzed to be installed or executed. Instead of executing the program and tediously attempting to detect security access violations at runtime, a mathematical model of the program can be generated and security violations are identified by reasoning on the model. Thus, one or more embodiments of the disclosed techniques for evaluating computer program security access control violations using static program analysis can provide benefits in terms of resource consumption and risk exposure. The subject static program analysis techniques can also provide for identifying all possible security violations of a computer program in an efficient and automated manner without false negatives. This means that if there is an access-control-enforcement violation anywhere in the program, the violation will be identified and reported. Accordingly, all (or, in some embodiments, one or more) program vulnerabilities can be identified and fixed before runtime. Moreover, the subject static program analysis techniques can operate on source code or object code, which can be useful for analysis of libraries or other program elements for which the associated source code is not available.

Turning now to the drawings, FIG. 1 illustrates a block diagram of an example, non-limiting system 100 that can facilitate identifying computer program security access control violations using static analysis in accordance with one or more embodiments of the disclosed subject matter. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 and/or the components of the system 100 can be employed to use hardware and/or software to solve problems that are highly technical in nature, that are not abstract, and that cannot be performed as a set of mental acts by a human, e.g., analyzing object code, mapping all (or, in some embodiments, one or more) possible program call flows, and identifying and reporting security access control violations prior to runtime in some embodiments. Further, some of the processes performed can be performed by specialized computers for carrying out defined tasks related to static program analysis. System 100 and/or components of system 100 or other systems described herein can be employed to solve new problems that arise through advancements in technology, computer networks, the Internet, and the like. The system 100 can provide technical improvements to program analysis in general, and more specifically to security access control enforcement analysis and related domains. For instance, system 100 can be employed to evaluate a computer program before runtime to determine with 100 percent certainty whether any authorization check is not preceded by the appropriate authentication routine, and to determine whether access to any sensitive resource is not preceded by the appropriate authorization check. System 100 can further identify and report specific processes and call flows that lead to security access failures so that the errors can be corrected before runtime.

System 100 can include a computing device 102 that can comprise a processor 118 and a memory 104 that stores executable instructions or components that, when executed by the processor, facilitate performance of operations. These operations can include identifying and reporting security access control violations associated with a computer program (e.g., computer program product 120). In the embodiment shown, the executable components can include a static analysis component 106, a report component 112 and a notification component 114. The computing device 102 can also include a device bus 116 to communicatively connect the various components of the computing device 102, including the memory 104 and the processor 118. Additional features and functionalities of said processor 118 and memory 104, as well as other suitable computer or computing-based elements, can be found with reference to FIG. 9, and can be used in connection with implementing one or more of the systems or components shown and described in connection with FIG. 1 or other figures disclosed herein.

In various embodiments, the computing device 102 can be configured to receive a computer program product 120 as input. Using the static analysis component 106, the computing device 102 can further be configured to evaluate the computer program product 120 to determine whether the computer program product, when executed at runtime, would provide unauthorized access to one or more defined protected resources or data objects, wherein the computer program product comprises one or more security protocols configured to prevent such unauthorized access. For example, the one or more security protocols can include an authorization procedure that is designed to check whether an entity attempting to access a secure resource is authorized to do so. In some implementations, the static analysis component 106 can also be configured to determine whether there is a scenario wherein at runtime, an authorization procedure is not preceded by a required authentication procedure that verifies the identity of the entity. Such security protocol implementations failures are referred to herein generally as security access control violations.

For example, modern software runtime environments (e.g., JAVA®, ANDROID®, iOS®, MICROSOFT.NET®, common language runtime (CLR), etc.), operating systems and application servers often come with internal authentication and authorization systems. As a result, developers writing applications to these environments, operating systems and application servers do not have to code all (or, in some embodiments, one or more) the authorization and authentication checks, but can just invoke the necessary application program interfaces (APIs) and rely on the underlying systems to enforce the required security access control calls. However, there is no guarantee that even the security measures adopted at the level of the underlying runtime environment have been properly implemented and enforced. For example, there may be paths leading to authorization checks without a previous authentication check, and there may be paths leading to sensitive resources that are not guarded by the appropriate authorization checks.

System 100 can provide techniques to verify, prior to runtime, that a security protocol of a program product (e.g., computer program product 120) will be properly implemented and enforced at runtime. In particular, system 100 can employ one or more static program analysis techniques to determine, prior to runtime, whether there exists any call flows to and through the computer program product 120 that can allow the entity initiating the call flow to reach a protected resource without passing through the appropriate security protocol/measure. For example, the entity can be or include another computer program or application, another device, another system, a user, etc.

In various embodiments, the computer program product 120 can include software computer program data such as but not limited to: source code, object code, byte code, library modules, application code, and the like. The computer program product 120 could be a complete program or an incomplete program. In some implementations, the computer program product 120 can be created in an integrated development environment (IDE) or another programming tool associated with computing device 102 or another computing device (not shown). In various implementations, the computer program product 120 can provide the runtime environment processing code or language that is used by an operating system or device to execute another program.

The computer program product 120 can also include one or more security models or protocols that are designed to control access to one or more defined protected resources (e.g., an object, a file, a socket, a method, a program, a system, a device). For example, in some implementations, the security protocol can include an authentication procedure that determines whether an entity requesting access is who they claim to be (e.g., based on reception of additional information that verifies or confirms the identity of the entity, such as a pass-code, password, secret key, etc.). The one or more security protocols can also include an authorization procedure that determines whether an entity is authorized to access the secure resource, such as by comparing a unique identifier for the entity with a list of entities authorized to access the protected resource. In some implementations, the one or more security protocols can include both an authentication procedure that is preceded by an authorization procedure.

As used herein, a "secure" or "protected" resource refers to a resource that is accessible by a computer using a computer program executed by the computer (e.g., computer program product 120). The secure resource can include for example, a data object, a file, a socket, a method, a program, a system, a device, or other suitable computer accessible resource. The secure resource can be remote from the computer (e.g., accessed via a network) or contained within the physical confines of the computer. A resource is deemed secure based on the security measures implemented by the system or programmer that are designed to protect access to the resource. Some resources may be guarded by security checks in some cases but not in other cases. The subject disclosure is concerned with identifying instances a computer program that enables access to a protected resource without the appropriate security check.

In some implementations, the one or more defined or protected resources can include data objects or process provided by the computer program product 120. In other implementations the one or more protected resources can include software or hardware provided or by a computing device (e.g., computing device 102) or operating system that runs the computer program product. For example, according to this implementation, the computer program product 120 can provide a runtime environment protocol information that can used by an operating system or device to execute one or more additional computer program products. With this implementation, the protected resources can include hardware and/or software of the operating system or device. Still in another implementation, the one or more protected resources can include software or hardware provided by an external or remote computing device or system that is communicatively coupled to the computer program product.

The static analysis component 106 can employ one or more defined static analysis functions to identify potential access control security violations in a computer program product 120 received as input. The exemplary embodiments are flexible and configurable and verify complete mediation for different resources and with different security checks. The exemplary embodiments can support both open-world and closed-world. Open-world means that a software program is incomplete. Closed-world is a complete program. The exemplary embodiments are precise, theoretically sound and conservative. The exemplary embodiments may verify that every access to a secure resource is preceded by a security check.

In the embodiment shown, the static analysis component 106 can include modeling component 108 and security evaluation component 110 to facilitate static program analysis of the computer program product 120 in association with detecting access control security violations prior to runtime. In various embodiments, the modeling component 108 can initiate the static program analysis by generating a mathematical model of the computer program product and the security evaluation component 110 can reason on the model to identify any potential access control security violations prior to runtime. In one or more implementations, the mathematical model can define all (or, in some embodiments, one or more) data flows or call flows through nodes of the computer program product that reach a protected node corresponding to a protected resource (also referred to herein as a secure data object). In implementations in which the computer program product includes more than one secure data object, the mathematical model can define all (or, in some embodiments, one or more) data flows or call flows for each (or in some cases, one or more) of the secure data objects. In this regard, the mathematical model can be or correspond to model data that defines a call graph of the computer program product.

Figure 2:
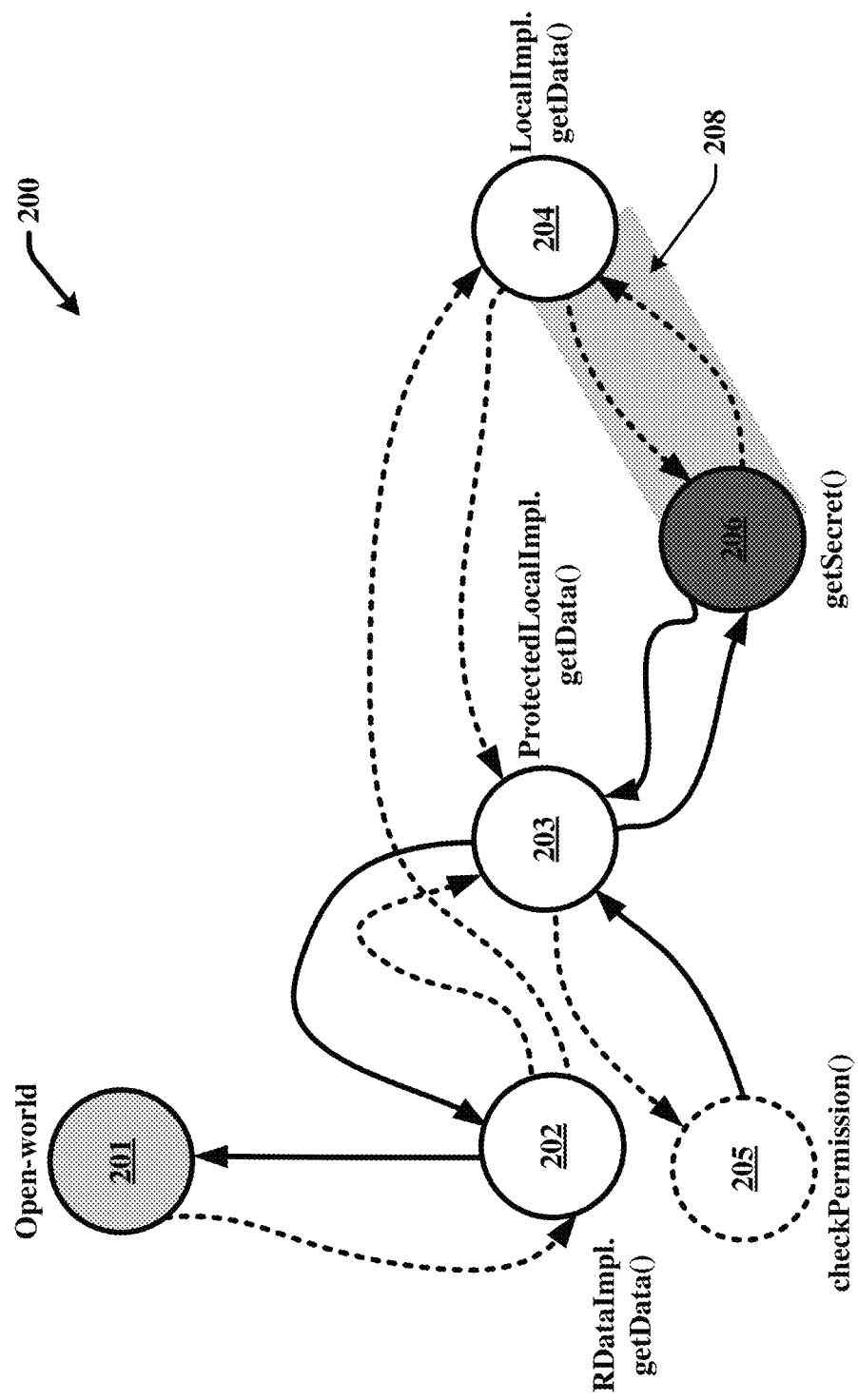
FIG. 2 presents an example call graph for a computer program with a protected resource and a security protocol configured to control access to the protected resource in accordance with one or more embodiments described herein.

For example, FIG. 2 presents an example call graph 200 for a computer program with a protected resource and a security protocol configured to control access to the protected resource in accordance with one or more embodiments described herein. A computer program call graph such as call graph 200 represents the calling relationships between routines and subroutines in a computer program. A call graph indicates which procedures can call which other procedures, and from which program points. Specifically, each node represents a procedure and each edge (f, g) indicates that procedure f calls procedure g. Repetitive description of like elements employed in respective embodiments is omitted for sake of brevity With reference to FIG. 2, call graph 200 includes a plurality of nodes 201, 202, 203, 204, 205 and 206 that respectively correspond to different functions or methods of a computer program, such as computer program product 120. The dashed and solid arrow lines in call graph 200 respectively represent edges of call flows. In the embodiment shown, the protected resource is a security sensitive method referred to as getSecret. The security sensitive method getSecret is represented by node 206. Node 201 represents the initial entry point to the program, referred to as Open-world. Nodes 202, 203 and 204 respectively represent different methods or functions of the program, respectively referred to as RDataImpl.getData( ), ProtectedLocalImpl.getData( ), and LocalImpl.getData( ). The program includes a security protocol referred to as checkPermission ( ) represented by node 205. According to the Principle of Complete Mediation, the getSecret method should not be reachable without passing through checkPermission( ). In particular, any call to getSecret should be preceded by a call to checkPermission( ).

Unfortunately the program represented by call graph 200 may have been written incorrectly and/or bugs may have been introduced into the program. Accordingly, in the embodiment shown, there is call path to getSecret that can be made without going through checkPermission( ). For example, in call graph 200, the dashed lines represent calls (or edges) that do not follow a call through checkPermission( ) and the solid lines represent calls (or edges) that follow a call through checkPermission( ). Because getSecret has been designated as a protected resource, any call to getSecret should be preceded by a call to checkPermission ( ) and thus be represented by a solid line. However, as shown by the highlighted area of the graph indicated by arrow 208, a call from node 204 (e.g., the LocalImpl.getData( ) method) to node 206 (e.g., getSecret) is depicted by a dashed line. Accordingly, there lies a path wherein calls can be made from the LocalImpl.getData( ) method to getSecret without passing through checkPermission( ). FIG. 3 presents the source code 300 of the program represented in call graph 200 in accordance with various aspects and embodiments described herein.

With reference again to FIG. 1, in one or more embodiments, based on reception of a computer program product 120 as input, the modeling component 108 can generate a mathematical model for the computer program the comprises model data defining all (or, in some embodiments, one or more) data flows or call flows through nodes of the computer program product that reach a protected node corresponding to a protected resource. In some implementations, the modeling component 108 can be configured to identify the respective nodes of the computer program product, the call flows between them, the one or more node corresponding to the protected resources, and/or the one or more node corresponding to the security protocols designed to control access to the one or more protected resources. In other implementations, the static analysis component 106 can receive additional input (e.g., in addition to the computer program product itself), identifying the call flows between them, the one or more node corresponding to the protected resources, and/or the one or more node corresponding to the security protocols designed to control access to the one or more protected resources.

The security evaluation component 110 can further evaluate the security protocol of the computer program product using static program analysis of the mathematical model to determine whether any of the data flows provides access to the protected node without proceeding through one or more security nodes corresponding to the security protocol. In various embodiments, the static program analysis employed by the security evaluation component 110 can comprise evaluating the data flows of the computer program product as an interprocedural control-flow graph reachability problem using an interprocedural, finite, distributive, subset (IFDS) algorithm. In particular, using the IFDS algorithm, the security evaluation component 110 can be configured to evaluate the computer program product as an interprocedural control-flow graph reachability problem using the IDS algorithm, wherein data flow functions or paths that lead to reachable nodes corresponding to protected resources that do not result in cancelation of a defined data flow fact are identified as violations to the security access policy. For example, by applying the IFDS algorithm to the mathematical model defining the call flows of the computer product program, at each entry point in the program, a data flow fact can generated for a resource that is supposed to be guarded by the security policy. The data flow fact for a given resource can be killed at the point a security check (e.g., an authentication and/or authorization check) is performed. Accordingly, if access to a sensitive resource is reached with the corresponding data flow fact still alive, that means that in the static representation, a path exists along which a security check has not been performed.

The IFDS framework is a conceptual framework for computing the results to IFDS problems. In such problems, flow functions are defined over a finite domain D and have to be distributive over the merge operator "u", (i.e., for any flow function f and any a, b E D it must hold that f(a) u f(b)=f(a u b)). When these conditions are fulfilled, the inter-procedural data-flow analysis problem can be fully reduced to a graph reachability problem. For example, the IFDS framework defines the mathematical model representing all (or, in some embodiments, one or more) data flows for a computer program product as a "supergraph" G* wherein G*=(N*, E*). G* consists of a collection of flow graphs flow graphs $G_1, G_2, \ldots$ (one for each procedure), one of which, $G_{main}$ represents the program's main procedure. Each flowgraph $G_p$ has a unique start node, and a unique exit node. The other nodes of the flowgraph represent the statements and predicates of the procedure in the usual way, except that a procedure call is represented by two nodes, a call node and a return-site node.

Using the call graph (or supergraph G*) generated for a program according to the IDFS framework, any node (s, d) is reachable from a special distinct start node if and only if the data-flow fact (d) holds at statement (s). For example, IFDS dataflow analysis works on sets of facts or data-flow facts. GEN points are nodes in the graph where a data flow fact (d) is generated or about becomes true, and KILL points are nodes in the graph where a particular data flow face (d) is killed/canceled or becomes false. For example in a constant propagation analysis problem, assuming the program was analyzed in association with variable x having a value of 3, any point in the graph where x is assigned the value 3 would be a GEN point and any point in the graph where x is assigned a constant value other than 3 would be a KILL point.

According to the IFDS framework, a computer program (e.g., computer program product 120) can be evaluated as a graph reachability problem using static analysis if the program consists of a finite set D of data flow facts and the dataflow functions (which are in $2^D \rightarrow 2^D$) distribute over the meet operator (either union or intersection, depending on the program). Accordingly, if D is the (finite) set of data-flow facts as defined above, we indicate with $2^D$ the power set of D, meaning the set of the subsets of D. $2^D$ is finite because D itself is finite. $2^D$ is naturally equipped with the union operator, U. In fact, the pair $(2^D, \cup)$ is known to be a semi-lattice. At every step in the propagation system, elements of $2^D$ are propagated throughout the IFDS graph, and at each step of the propagation, set unions are performed (except in the case in which a data-flow fact is killed). This means that the function that, for each IFDS graph node, transforms the set of data-flow facts associated with that node into a more precise set on each iteration of the propagation process is monotonic. Since the $(2^D, \cup)$ semi-lattice is finite, it is complete and has finite height. Therefore, the propagation process can be proved to converge in finite time.

Thus in accordance with various embodiments, the security evaluation component 110 can apply the IFDS framework to the call graph model generated by the modeling component 108 and analyze the computer program as a graph reachability problem. In this regard, the security evaluation component 110 can generate a specific data flow fact for each protected resource at each node corresponding to entry point to the program as defined by the mathematical model data describing all (or, in some embodiments, one or more) data flows for the computer program product that lead to the protected resource. For example, the security evaluation component 110 can instantiate unique data flow facts for each protected resources at respective call sites in program entry points (e.g., the GEN points). The data flow fact can include a fact that remains true (e.g., is not killed) regardless of the number and sequence of program functions through which it is passed, unless is passes through a security node corresponding to the defined security check for the protected resource. In particular, based on application of the IFDS function, the data flow fact will only become false or killed if it passes through the security check (i.e., the KILL point) with success (e.g., authentication and/or authorization is verified). Accordingly, if a secure resource is reached with the data flow fact alive, the security evaluation component 110 can determine that there exists a data flow path in the program that violates the security policy associated with the protected resource (i.e., the protected resource is accessible without the required security check). For example, the data flow facts can be propagated throughout the program and killed only on exit of a security check.

Figure 4:
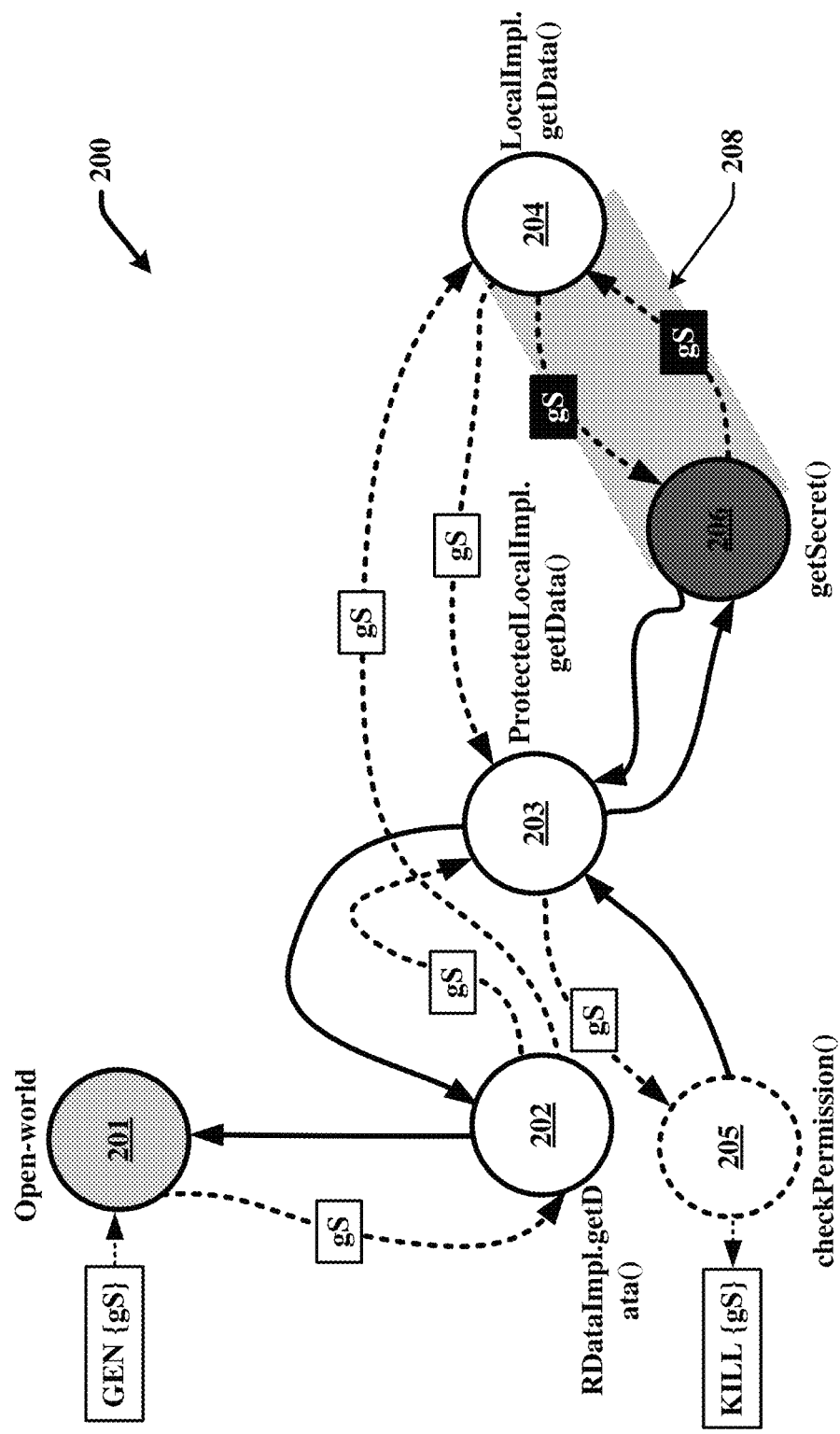
FIG. 4 illustrates application of static program analysis based on the interprocedural, finite, distributive, subset (IFDS) framework to a computer program product in order to detect security access control violations prior to runtime, in accordance with one or more embodiment described herein.

FIG. 4 illustrates application of static program analysis based on the IFDS framework to a computer program product in order to detect security access control violations prior to runtime, in accordance with one or more embodiment described herein. FIG. 4 particularly exemplifies how IFDS can be used by the security evaluation component 110 to evaluate the computer program product defined by call graph 200. Repetitive description of like elements employed in respective embodiments is omitted for sake of brevity.

As described with reference to FIG. 2, the computer program product represented by call graph 200 includes a data flow path (identified by arrow 208) to the secure resource represented by node 206 getSecret( ) that can be made without going through the security node 205 corresponding to checkPermission( ). In accordance with application of the IFDS algorithm to the call graph 200, the security evaluation component 110 can determine that this access control security violation exists by generating a data flow fact for the secure resource at the entry point to the program and propagating this data flow fact through all (or, in some embodiments, one or more) the call flows. For example, in the embodiment shown, this data flow fact is identified as gS. The data flow fact gS can be generated at the entry node 201 and propagated through all (or, in some embodiments, one or more) call flows that provide a path to the protected node 206. The dashed arrow lines correspond to call flow edges that have not passed through the security node 206, and the solid arrow lines correspond to call flow edges that have passed through the security node 205. In the embodiment shown, the data flow fact gS is killed at security node 205. Accordingly, the solid arrow lines are do not have the data flow fact gS attached. As shown by the diagram, the data flow fact gS (called out in the black boxes) can reaches the protected node 206. This means that there exists at least one call flow path to the protected node 206 that is not preceded by the security protocol provided by the security node 205.

In one or more embodiments, the output of the IFDS algorithm as applied to model data defining the call flows of a computer program product can include either no alive data flow facts (which indicates that the security protocol of the computer program product has no access control security violations) or one or more alive data flow facts (which indicates that the security protocol of the computer program product has one or more access control security violations). In some implementations, the number of alive data flow facts generated after application of the IFDS algorithm to all (or, in some embodiments, one or more) data flows of the computer program product can correspond to the number of data flows that provide unauthorized access to the protected resource. In various embodiments, the security evaluation component 110 can be configured to determine the particular call flow path that is in violation of the security protocol by identifying the nodes that connect to the protected node with the data flow fact still intact. For example, in accordance with the computer program product represented by call graph 200, by going in the reverse call flow order from the protected node, the call flow path with the data flow fact attached goes from node 204, to node 202 and then to the entry node.

With reference back to FIG. 1, the report component 112 can further generate a security evaluation report 122 that includes a result of the analysis performed by the IFDS static analysis component. In particular, based on the static program analysis, using the report component 112, the computing device 102 can generate an output that includes a security evaluation report 122 providing the results of the static analysis. This report can be stored (e.g., in memory 104 of the computing device 102), and/or rendered via a display (e.g., at the computing device or another device). For example, the security evaluation report 122 can include information regarding whether any of the data flows provides access to the protected node/protected resource. In some implementations, the security evaluation report 122 can also include information identifying an amount of the one or more data flows that provides the access to the protected node without proceeding through the one or more security nodes corresponding to the security enforcement protocol. In addition, in some embodiments the security evaluation report 122 can include information that identifies the one or more data flows. For example, the data flow can identify the respective nodes called and the order in which the respective nodes are called prior reaching the protected node.

In other embodiments, in addition to or in the alternative to generating a report, the notification component 114 can be configured to generate a security issue notification 124 in response to a determination that an evaluated computer program product has an access control security violation problem. For example, the notification can include an electronic signal, message, alarm, or the like. In particular, the notification component 114 can be configured to generate a notification based on a determination that one or more data flows of the data flows provides access to the protected node without proceeding through the one or more security nodes corresponding to the security enforcement protocol. In some implementations, the security issue notification 124 can comprise information indicating the computer program product has a security access control issue associated with the protected data object. The security issue notification 124 can also comprises information identifying an amount of the one or more data flows that provides the access to the protected node without proceeding through the one or more security nodes corresponding to the security enforcement protocol. Further in other embodiments, the security issue notification 124 can identify the one or more data flows.

It should be appreciated that the computer program product 120 can be stored at the computing device 102 (e.g., in memory 104) or at another device (not shown) accessible to computing device 102. In addition, the security evaluation report 122 and/or the security issue notification 124 can be stored at the computing device 102 (e.g., in memory 104), rendered at the computing device 102 (e.g., via a display or other suitable output device), and/or sent to another device.

FIGS. 5-8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Figure 5:
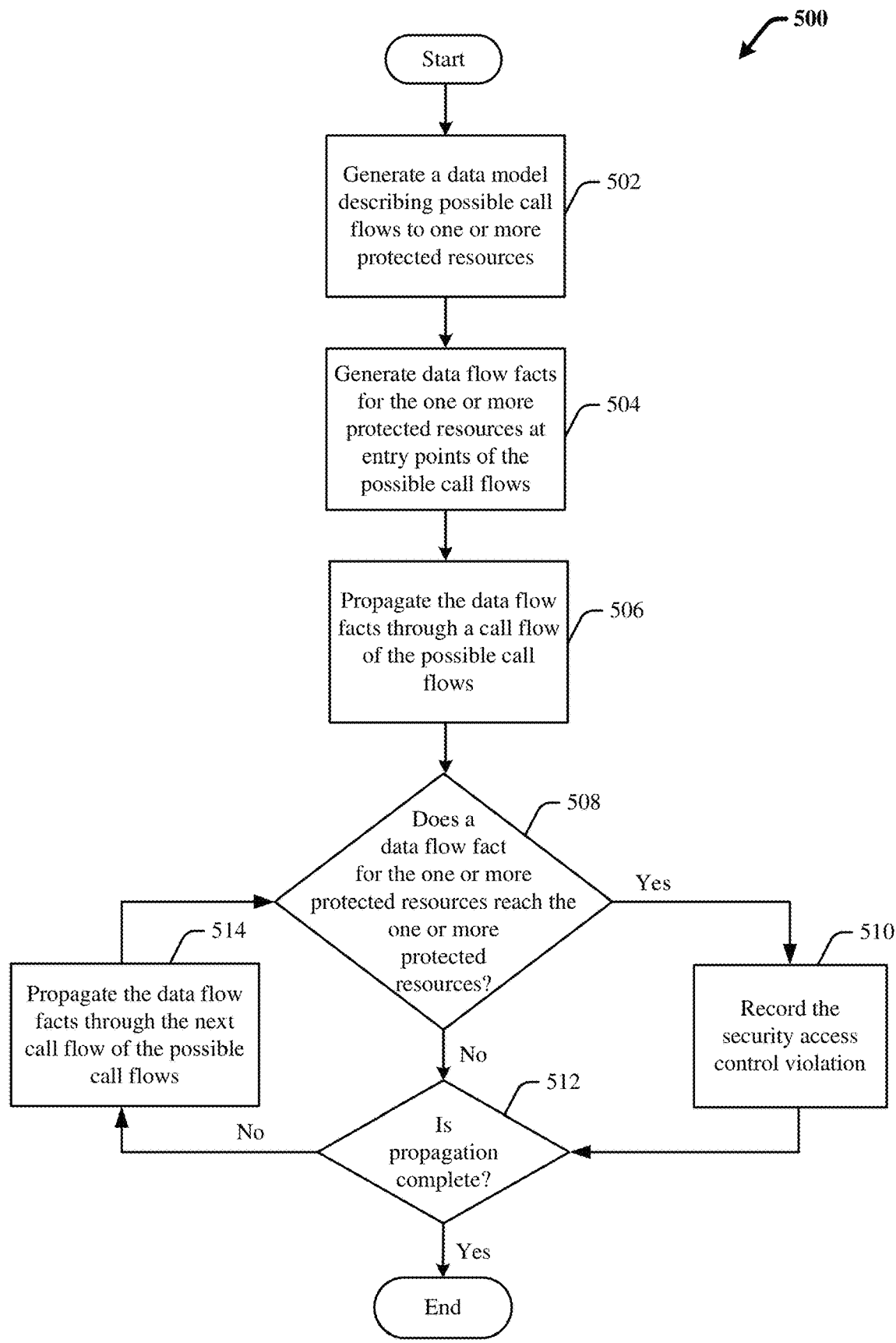
FIG. 5 illustrates a flow diagram of an example, non-limiting computer-implemented method that facilitates identifying computer program security access control violations using static program analysis in accordance with one or more embodiments of the disclosed subject matter.

FIG. 5 illustrates a flow diagram of an example, non-limiting computer-implemented process 500 that facilitates identifying computer program security access control violations using static analysis. Repetitive description of like elements employed in respective embodiments is omitted for sake of brevity.

In one or more embodiments, process 500 can be performed by the static analysis component 106 of computing device 102 in association with reception of a computer program product (e.g., computer program product 120) as input. At 502, the static analysis component 106 can generate a data model describing all (or, in some embodiments, one or more) possible call flows to one or more protected resources of the computer program product (e.g., using modeling component 108). At 504, the static analysis component 106 can generate data flow facts for the one or more protected resources at entry points of the possible call flows (e.g., via security evaluation component 110). At 506 the static analysis component 106 can propagate the data flow facts through a call flow of the possible call flows. At 508, the static analysis component 106 can determine whether a data flow fact for the one or more protected resources reaches the one or more protected resources (e.g., based on not being killed) prior to reaching the protected resource). If at 508 the static analysis component determines that the data flow fact did reach its protected resource, then at 510, the static analysis component can record the event as a security access control violation. In some implementations, at 510 the static analysis component can record information identifying the particular protected resource that was reached, and the call flow that was followed to reach the particular protected resource. The process 500 then proceeds to 512. Likewise, if at 508 the static analysis component determines that the data flow fact did not reach its protected resource, then process 500 proceeds directly to 512.

At 512, the static analysis component 106 can determine whether the propagation is complete. In this regard, the static analysis component 512 can determine whether the one or more data flow facts have been propagated through all (or, in some embodiments, one or more) possible call flows. The propagation is complete, process 500 can end and the report component 112 and/or the notification component 114 can respectively generate a report or notification regarding the security access control violations that were identified at 510, if any. If however at 512, the static analysis component 106 determines that the propagation is not complete, process 500 proceeds to 514 wherein the static analysis component 106 can propagate the data flow facts through the next call flow of the possible call flows. The static analysis component 106 can evaluate the next call flow and so on at 508 until all (or, in some embodiments, one or more) call flows have been propagated.

Figure 6:
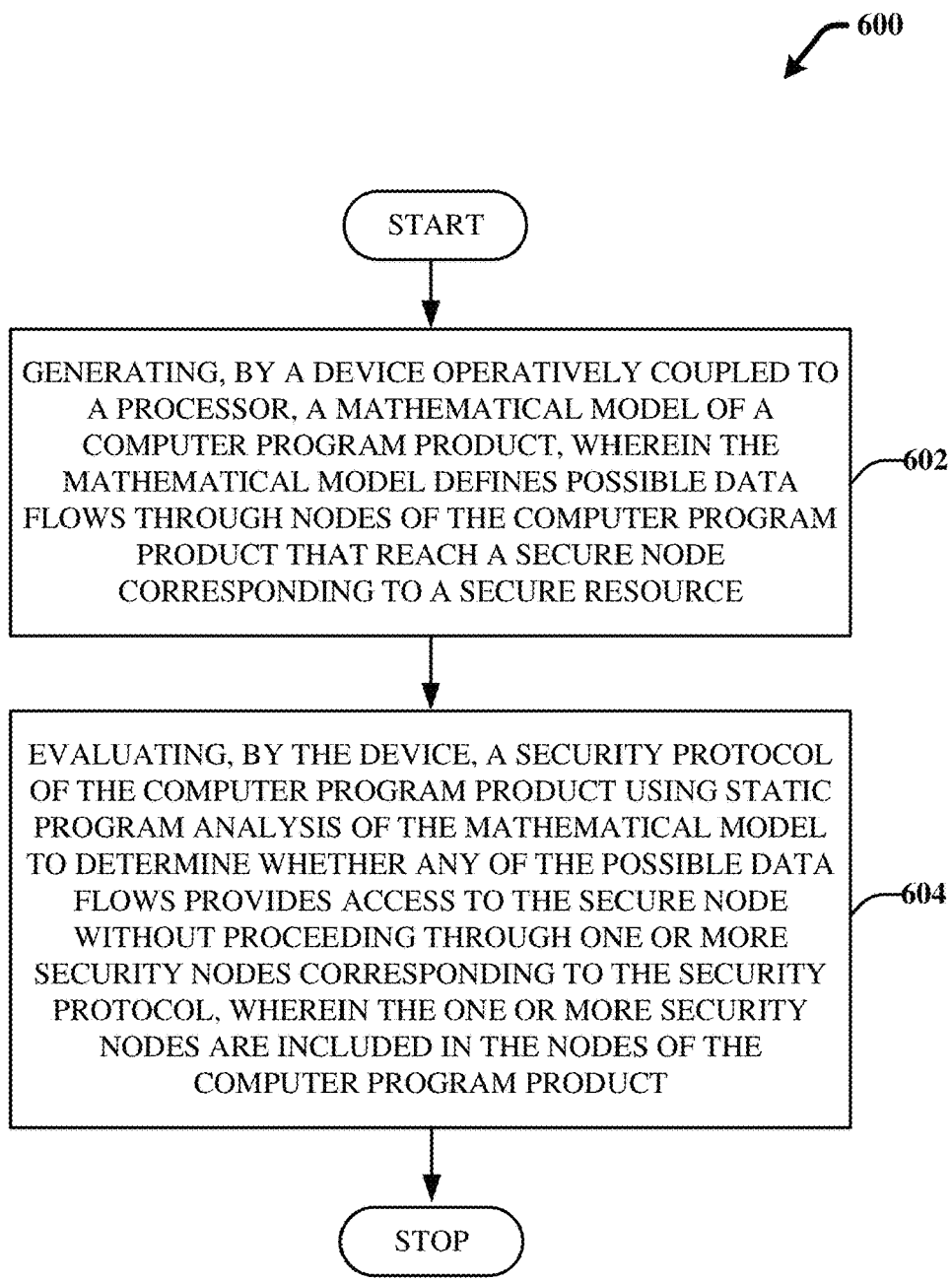
FIG. 6 illustrates a flow diagram of another example, non-limiting computer-implemented method that facilitates identifying computer program security access control violations using static program analysis in accordance with one or more embodiments of the disclosed subject matter.

FIG. 6 illustrates a flow diagram of an example, non-limiting computer-implemented method 600 that facilitates identifying computer program security access control violations using static analysis. Repetitive description of like elements employed in respective embodiments is omitted for sake of brevity.

At reference numeral 602, a device operatively coupled to a processor (e.g., computing device 102), can generate a mathematical model of a computer program product, wherein the mathematical model defines all (or, in some embodiments, one or more) data flows through nodes of the computer program product that reach a secure node corresponding to a secure resource (e.g., using modeling component 108). At 604, the device can evaluate a security protocol of the computer program product using static program analysis of the mathematical model (e.g., via security evaluation component 110) to determine whether any of the data flows provides access to the secure node without proceeding through one or more security nodes corresponding to the security protocol, wherein the one or more security nodes are included in the nodes of the computer program product. In various implementations, the static program analysis comprises evaluating the data flows as an interprocedural control-flow graph reachability problem using an IFDS algorithm.

Figure 7:
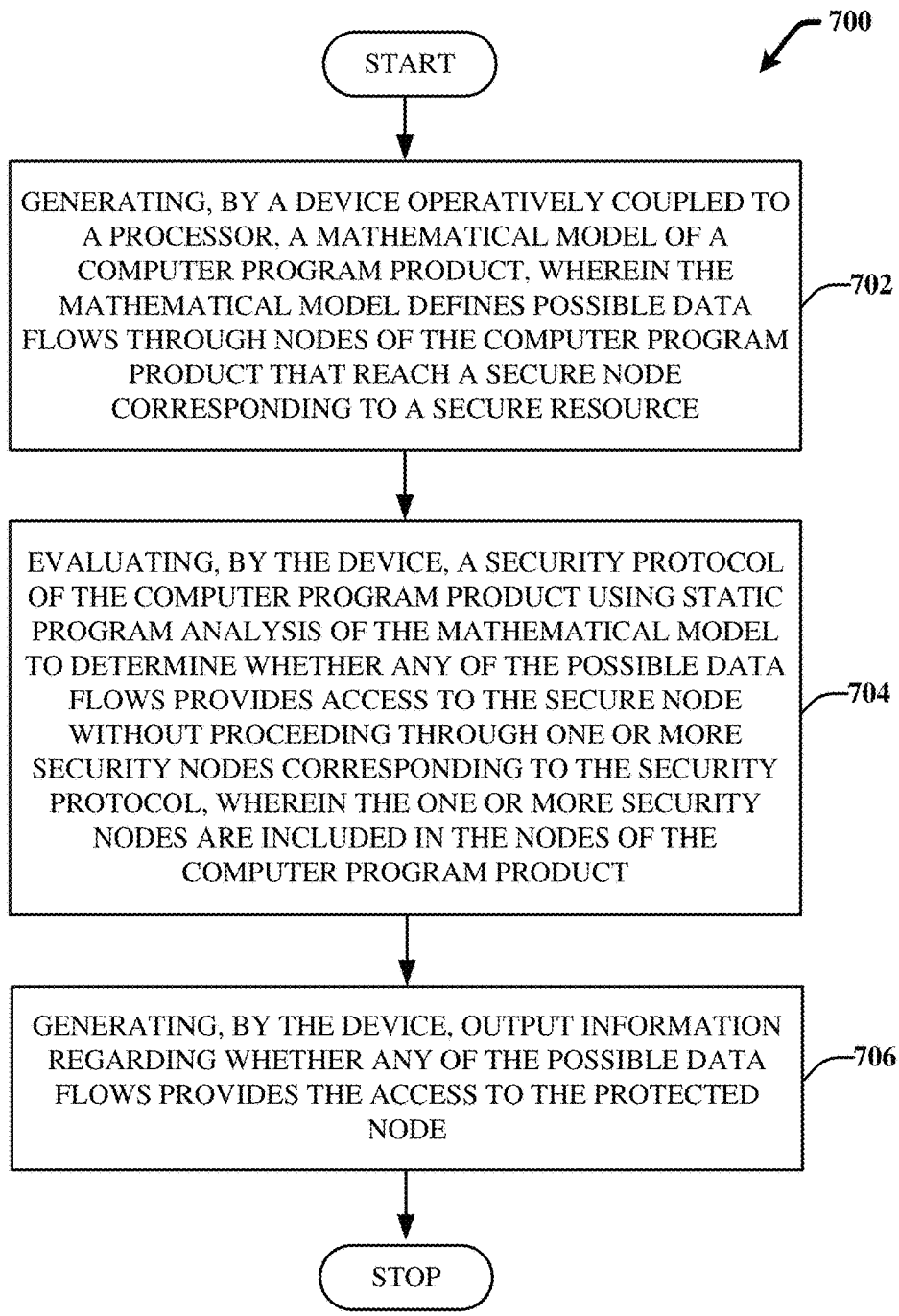
FIG. 7 illustrates a flow diagram of another example, non-limiting computer-implemented method that facilitates identifying computer program security access control violations using static program analysis in accordance with one or more embodiments of the disclosed subject matter.

Turning now to FIG. 7, illustrated is a flow diagram of another example, non-limiting computer-implemented method 700 that facilitates identifying computer program security access control violations using static analysis. Repetitive description of like elements employed in respective embodiments is omitted for sake of brevity.

At reference numeral 702, a device operatively coupled to a processor (e.g., computing device 102), can generate a mathematical model of a computer program product, wherein the mathematical model defines all (or, in some embodiments, one or more) data flows through nodes of the computer program product that reach a secure node corresponding to a secure resource (e.g., using modeling component 108). At 704, the device can evaluate a security protocol of the computer program product using static program analysis of the mathematical model (e.g., via security evaluation component 110) to determine whether any of the data flows provides access to the secure node without proceeding through one or more security nodes corresponding to the security protocol, wherein the one or more security nodes are included in the nodes of the computer program product. At 706, the device can generate output information regarding whether any of the data flows provides the access to the protected node (e.g., the security evaluation report 122 generated by the report component 112).

Figure 8:
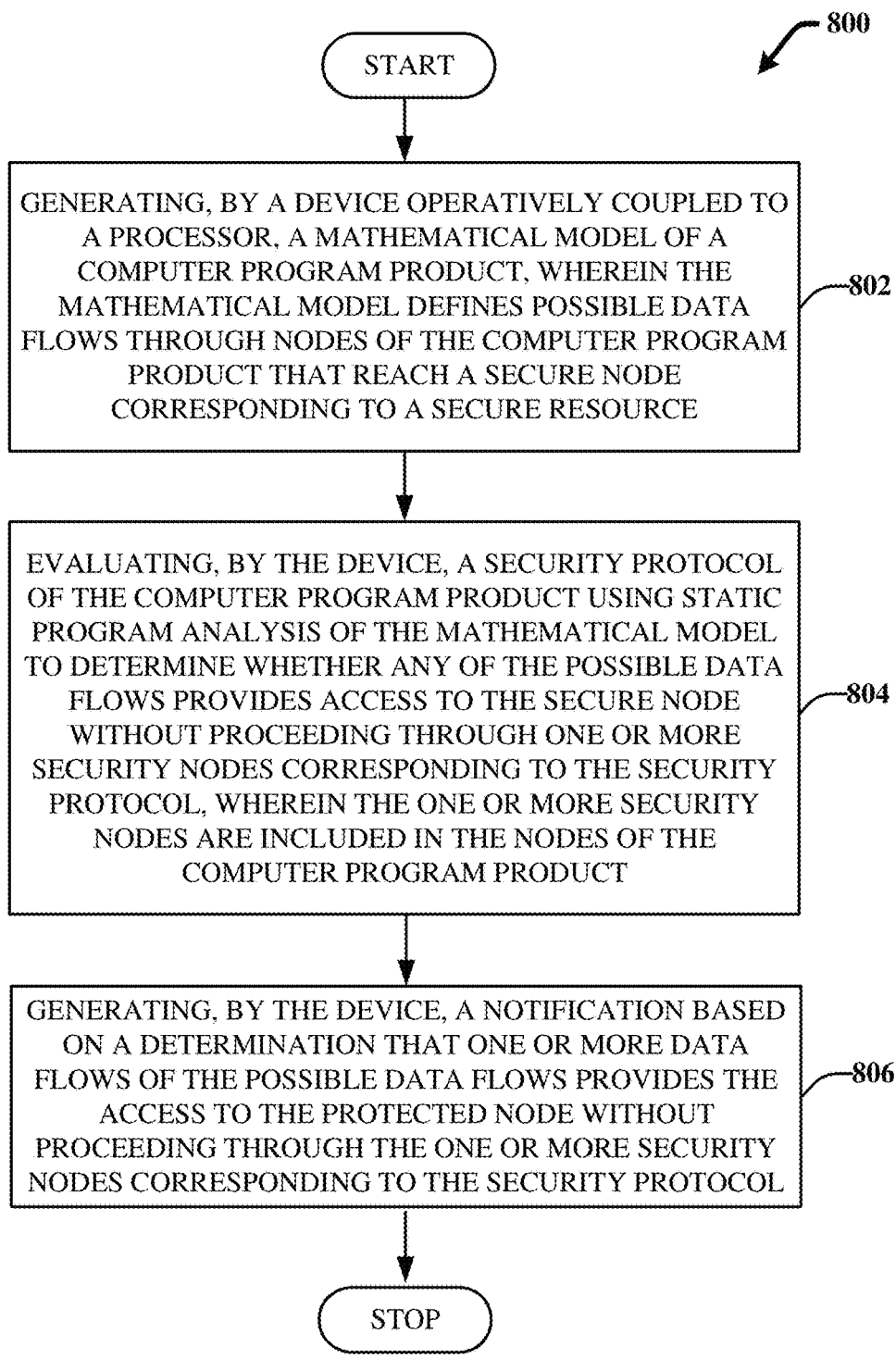
FIG. 8 illustrates a flow diagram of another example, non-limiting computer-implemented method that facilitates identifying computer program security access control violations using static program analysis in accordance with one or more embodiments of the disclosed subject matter.

FIG. 8 illustrates a flow diagram of another example, non-limiting computer-implemented method 800 that facilitates identifying computer program security access control violations using static analysis. Repetitive description of like elements employed in respective embodiments is omitted for sake of brevity.

At reference numeral 802, a device operatively coupled to a processor (e.g., computing device 102), can generate a mathematical model of a computer program product, wherein the mathematical model defines all (or, in some embodiments, one or more) data flows through nodes of the computer program product that reach a secure node corresponding to a secure resource (e.g., using modeling component 108). At 804, the device can evaluates a security protocol of the computer program product using static program analysis of the mathematical model (e.g., via security evaluation component 110) to determine whether any of the data flows provides access to the secure node without proceeding through one or more security nodes corresponding to the security protocol, wherein the one or more security nodes are included in the nodes of the computer program product. At 806, the device can generate a notification based on a determination that one or more data flows of the data flows provides the access to the protected node without proceeding through the one or more security nodes corresponding to the security protocol (e.g., the security issue notification 124 generated by the notification component 114). For example, in some implementations, the notification can comprise information indicating the computer program product has a security access control issue associated with the protected data object. In another example, the notification can comprise information identifying an amount of the one or more data flows that provides the access to the protected node without proceeding through the one or more security nodes corresponding to the security protocol. In yet another implementation, the notification can comprise information identifying the one or more data flows.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 9, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 9:
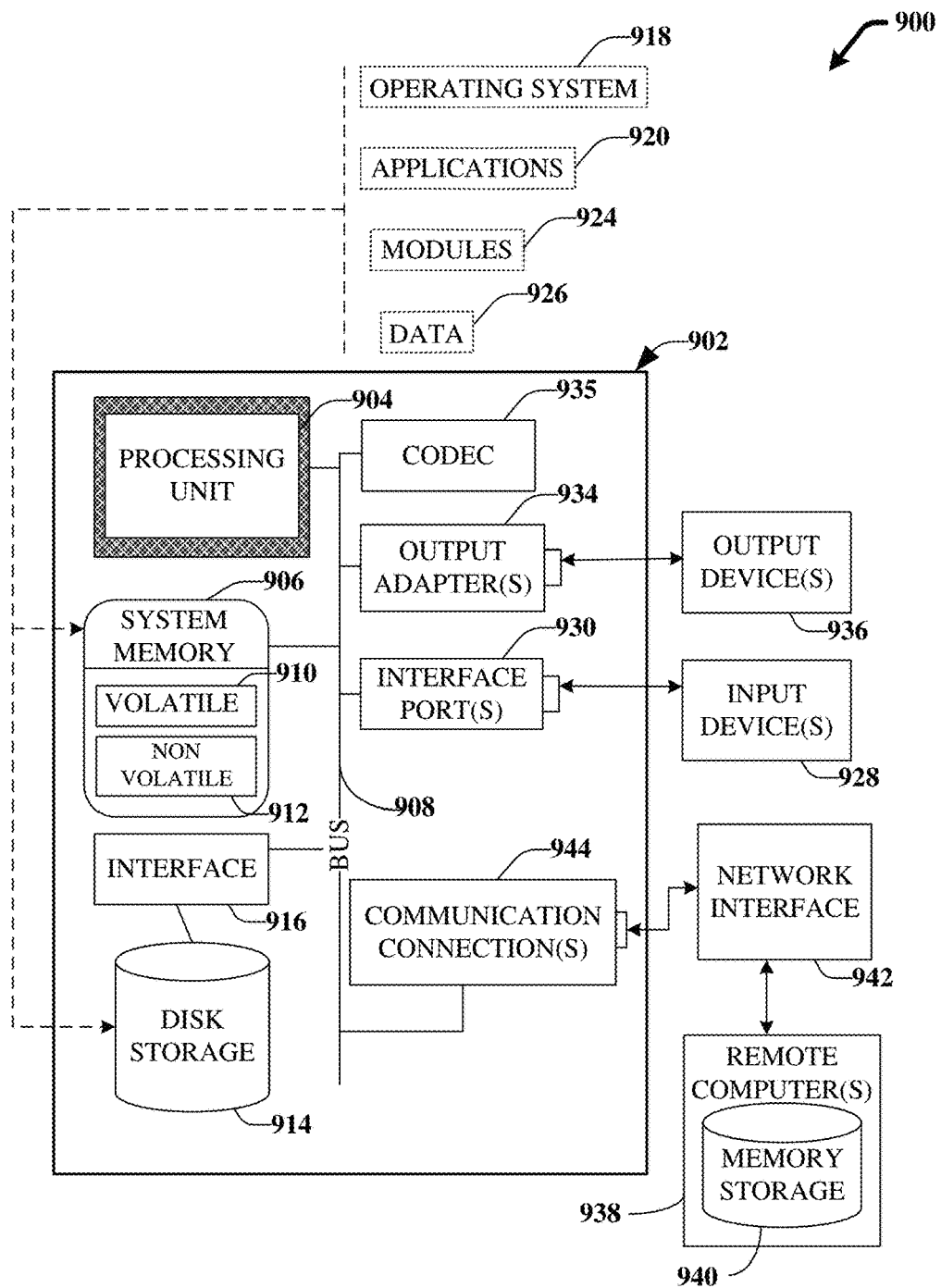
FIG. 9 illustrates a block diagram of an example, non-limiting operating environment in which one or more embodiments described herein can be facilitated.

With reference to FIG. 9, an example environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912, which can employ one or more of the disclosed memory architectures, in various embodiments. The basic input/output system (BIOS), containing the basic routines to transfer information between elements within the computer 902, such as during start-up, is stored in non-volatile memory 912. In addition, according to present innovations, codec 935 can include at least one of an encoder or decoder, wherein the at least one of an encoder or decoder can consist of hardware, software, or a combination of hardware and software. Although, codec 935 is depicted as a separate component, codec 935 can be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 912 can employ one or more of the disclosed memory devices, in at least some embodiments. Moreover, non-volatile memory 912 can be computer memory (e.g., physically integrated with computer 902 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 910 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 902 can also include removable/non-removable, volatile/non-volatile computer storage medium. FIG. 9 illustrates, for example, disk storage 914. Disk storage 914 includes, but is not limited to, devices like a magnetic disk drive, solid state disk (SSD), flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 914 to the system bus 908, a removable or non-removable interface is typically used, such as interface 916. It is appreciated that disk storage 914 can store information related to a user. Such information might be stored at or provided to a server or to an application running on a user device. In one embodiment, the user can be notified (e.g., by way of output device(s) 936) of the types of information that are stored to disk storage 914 or transmitted to the server or application. The user can be provided the opportunity to opt-in or opt-out of having such information collected or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port can be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes the computer executable components stored in the memory, wherein the computer executable components comprise:
a security evaluation component that evaluates a security protocol of a computer program product to determine whether data flows provide a path to a protected node that does not proceed through security nodes in an order corresponding to the security protocol, wherein the security nodes comprise an authorization node that checks an authorization of an entity to access the protected node and an authentication node that checks an authentication of the entity, and wherein the order comprises flow through the authentication node prior to flow through the authorization node.

2. The system of claim 1, wherein the computer program product provides runtime environment protocol information employed by an operating system to execute one or more additional computer program products.

3. The system of claim 1, wherein the security protocol comprises an authorization procedure that ensures an entity initiating any of the data flows is authorized to receive the access to the protected node.

4. The system of claim 1, wherein the security protocol comprises an authentication procedure that verifies an identity of an entity initiating any of the data flows.

5. The system of claim 1, further comprising:
a report component that generates output information regarding whether any of the data flows provides the access to the protected node.

6. The system of claim 1, further comprising: a notification component configured to generate a notification, wherein the notification comprises information indicating the computer program product has a security access control issue associated with the protected node.

7. The system of claim 1, further comprising:
a notification component configured to generate a notification, wherein the notification comprises information identifying an amount of the data flows that provides the access to the protected node without proceeding through the one or more security nodes corresponding to the security protocol.

8. A computer-implemented method, comprising: evaluating, by a device operatively coupled to a processor, a security protocol of a computer program product to determine whether data flows provide a path to a protected node that does not proceed through security nodes in an order corresponding to the security protocol, wherein the security nodes comprise an authorization node that checks an authorization of an entity to access the protected node and an authentication node that checks an authentication of the entity, and wherein the order comprises flow through the authentication node prior to flow through the authorization node.

9. The computer-implemented method of claim 8, wherein the computer program product provides runtime environment protocol information employed by an operating system to execute one or more additional computer program products.

10. The computer-implemented method of claim 8, wherein the security protocol comprises an authorization procedure that ensures an entity initiating any of the data flows is authorized to receive the access to the protected node.

11. The computer-implemented method of claim 8, wherein the security protocol comprises an authentication procedure that verifies an identity of an entity initiating any of the data flows.

12. The computer-implemented method of claim 8, further comprising:
generating, by the device, output information regarding whether any of the data flows provides the access to the protected node.

13. The computer-implemented method of claim 8, further comprising: generating, by the device, a notification, wherein the notification comprises information indicating the computer program product has a security access control issue associated with the protected node.

14. The computer-implemented method of claim 8, further comprising:
generating, by the device, a notification, wherein the notification comprises information identifying an amount of the data flows that provides the access to the protected node without proceeding through the one or more security nodes corresponding to the security protocol.

15. A computer program product that facilitates identification of security access control violations associated with a second computer program product, the computer program product comprising a computer readable storage medium having program instructions embodied therewith, the program instructions executable by a processor to cause the processor to: evaluates a security protocol of a computer program product to determine whether data flows provide a path to a protected node that does not proceed through security nodes in an order corresponding to the security protocol, wherein the security nodes comprise an authorization node that checks an authorization of an entity to access the protected node and an authentication node that checks an authentication of the entity, and wherein the order comprises flow through the authentication node prior to flow through the authorization node.

16. The computer program product of claim 15, wherein the security protocol comprises an authorization procedure that ensures an entity initiating any of the data flows is authorized to receive the access to the protected node.

17. The computer program product of claim 15, wherein the security protocol comprises an authentication procedure that verifies an identity of an entity initiating any of the data flows.

18. The computer program product of claim 15, wherein the program instructions are further executable by the processor to cause the processor to: generate a notification, wherein the notification comprises information indicating the computer program product has a security access control issue associated with the protected node.

19. The computer program product of claim 15, wherein the program instructions are further executable by the processor to cause the processor to:
generate a notification, wherein the notification comprises information identifying an amount of the data flows that provides the access to the protected node without proceeding through the one or more security nodes corresponding to the security protocol.

20. The computer program product of claim 15, wherein the program instructions are further executable by the processor to cause the processor to:
generate output information regarding whether any of the data flows provides the access to the protected node.

* * * * *